United States Patent [19]

Phillips

[11] 4,157,213
[45] Jun. 5, 1979

[54] MULTIFOCAL LENGTH LENS

[76] Inventor: Edward H. Phillips, 30 King George Rd., Warren, N.J. 07060

[21] Appl. No.: 817,190

[22] Filed: Jul. 20, 1977

Related U.S. Application Data

[63] Continuation-in-part of Ser. No. 625,176, Oct. 23, 1975, abandoned.

[51] Int. Cl.² .......................... G02B 5/16; G02C 7/06
[52] U.S. Cl. .................. 351/168; 350/96.25; 350/96.27; 350/194
[58] Field of Search .................. 350/96.25, 96.27, 194; 351/168, 172

[56] References Cited

U.S. PATENT DOCUMENTS

| | | | |
|---|---|---|---|
| 2,653,516 | 9/1953 | Johnson | 351/165 |
| 2,992,516 | 7/1961 | Norton | 350/96.25 |
| 3,594,075 | 7/1971 | Smith | 351/172 |

*Primary Examiner*—John K. Corbin
*Assistant Examiner*—Scott J. Sugarman
*Attorney, Agent, or Firm*—Shoemaker and Mattare, Ltd.

[57] ABSTRACT

A lens having portions of different optical characteristics includes a large number of small cross-section glass rods fused together in side-by-side parallel relationship, the rods throughout the lens having selected different optical characteristics whereby to obtain different viewing characteristics upon looking through the lens. The method for making the lens includes the steps of selecting a plurality of glass rods having different optical characteristics and fusing the rods together in a bundle with the optically different rods uniformly dispersed throughout the bundle, stretching the bundle to reduce the cross-section thereof to an extent that the individual rods are not visually discernible when the lens is used for viewing, and forming a lens from the stretched bundle.

14 Claims, 15 Drawing Figures

MULTIFOCAL LENGTH LENS

BACKGROUND OF THE INVENTION

This application is a continuation-in-part of Application Ser. No. 625,176, filed Oct. 23, 1975 now abandoned.

This invention relates to a lens having different optical characteristics uniformly dispersed therethrough, and more particularly, relates to a multifocal length lens comprising a plurality of fused together glass rods having different indices of refraction such as to obtain different focal lengths upon looking through the lens and focusing on objects at different distances from the lens. The individual rods of the lens are of such small size that they are not visually discernible when looking through the lens; and because the rods having different indices of refraction are uniformly dispersed throughout the lens, the user of the lens does not experience optical jump when shifting his gaze from near to distant objects and vice versa, and instead, a uniform and smooth transition from near to distant vision is obtained. Moreover, inasmuch as the different indices of refraction are dispersed throughout the lens, the user of the lens need not direct his gaze through a specified portion thereof in order to obtain a desired focal length for reading or distance viewing or the like, but instead, he may look through any portion of the lens and obtain the desired or necessary optical property for best vision. Additionally, in making the lens, the axes of the glass rods are oriented parallel to the line sight when viewing through any part of the lens.

Many efforts have been made in the prior art to obtain a multifocal length lens having characteristics such as to eliminate optical jump and the like. Two such prior art devices are exemplified in the U.S. Pat. Nos. to H. D. Beach, 1,955,047, and D. J. Smith, 3,594,075. In the Beach Patent a plurality of curvatures are ground or otherwise formed into the concave surface of the lens to obtain different optical characteristics. However, the lens described in this patent would be extremely difficult, if not impossible, to manufacture, since the accuracy required and the skill and dexterity necessary to obtain the many small curvatures on the concave surface of the lens would be nearly impossible to achieve.

On the other hand, the optical device disclosed in the Smith Patent comprises a plurality of light-transmitting laminar sections having different optical characteristics. The laminations in the Smith device extend completely across the width of the lens as seen in FIG. 6, for example, and in the preferred embodiment, it is necessary to have different curvatures on the rear surfaces of alternate laminations to obtain the desired optical characteristics, and it is thus necessary, or at least desirable, to fill the gaps remaining between alternate laminations. Thus, the lens of Smith is more complex and difficult to manufacture than the lens which is the subject of the invention described herein, and the optical characteristics of the finished lens are different from applicant's lens.

Moreover, efforts have been made in the prior art to produce bundles of optical fibers for various purposes, as, for example, to transmit light from one location to the other by directing light into one end of the bundle of fibers. Such prior art devices are exemplified, for example, in U.S. Pat. Nos. 3,216,807 to R. F. Woodcock, 3,837,824 to W. P. Siegmund, and 3,837,727 to F. H. Norton.

However, none of the prior art patents discloses or suggests a unique multifocal length lens comprised of a plurality of elongate rods fused together in side-by-side relationship and stretched to reduce the cross-section thereof and wherein alternate rods have different indices of refraction to thereby obtain different focal lengths from the lens when viewing objects at different distances from the lens.

Further, in one modification of a lens constructed in accordance with the invention, bundles of glass rods are assembled by a unique procedure, enabling a lens to be manufactured at a remarkably low cost.

OBJECTS OF THE INVENTION

Accordingly, it is an object of this invention to provide a multifocal lens having a plurality of small diameter glass rods fused together in side-by-side relationship, with the rods having different indices of refraction uniformly dispersed throughout the lens such as to obtain multifocal lengths when viewing through the lens and focusing on objects at different distances from the lens.

Another object of the invention is to produce a multifocal lens having different indices of refraction uniformly dispersed throughout the lens such that objects at different distances from the lens may be focused on through any part of the lens.

Another object of the invention is to provide a method for producing a multifocal lens, wherein a plurality of elongate glass rods having different indices of refraction are gathered together in parallel relationship with the different indices uniformly spaced throughout the bundle of rods and then fusing the rods together and stretching or drawing the bundle to reduce the diameters of the rods and subsequently slicing or cutting the drawn bundle transversely to obtain blanks from which the multifocal lenses are produced by grinding or molding and the like.

A still further object of the invention is to provide a method of making a multifocal lens wherein the steps of grinding the lens to produce the multifocal lengths thereof are reduced to a minimum.

Yet another object of the invention is to make a multifocal length lens which comprises a plurality of glass rods of different optical characteristics assembled together in a bundle with their axes oriented parallel to the line of sight through all portions of the lens and with rods of different optical characteristics dispersed substantially uniformly throughout the lens.

DETAILED DESCRIPTION OF THE PREFERRED EMBODIMENT

Figure 1:
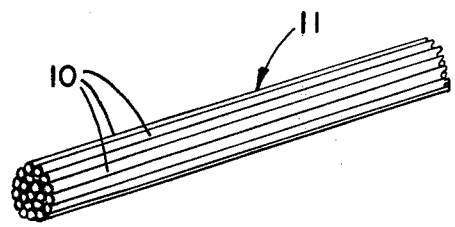
FIG. 1 is a somewhat schematic view in elevation of a lens embodying the teachings of the invention.
Figure 7:
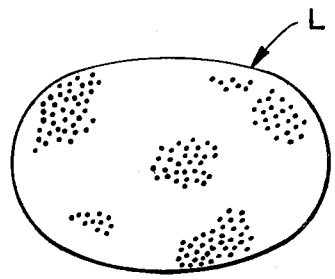
FIG. 7 is an enlarged schematic view in side elevation of one of the blanks of FIG. 6 from which a lens is ultimately produced.
Figure 3:
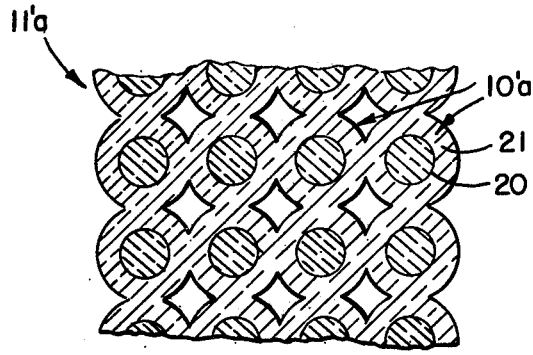
FIG. 3 is a somewhat schematic view in section of an apparatus used for fusing the rods together in the bundle of FIG. 2 and for drawing the rods down to a reduced diameter.
Figure 2:
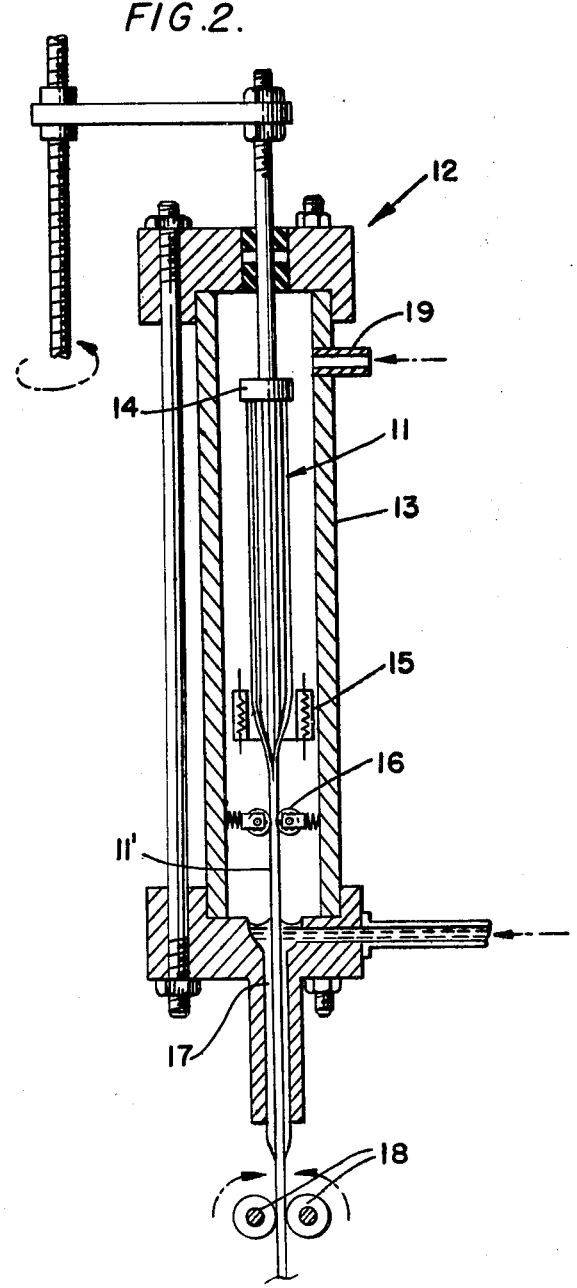
FIG. 2 is a perspective view of a bundle of rods secured together for making a lens in accordance with the invention.

In the drawings, wherein like reference numerals indicate like parts throughout the several views, a plurality of elongate glass rods 10 are gathered together to form a bundle 11 comprised of the rods 10. The bundle 11 is placed in a suitable apparatus 12 for heating and drawing the bundle to fuse the rods together and to reduce the cross-sectional size thereof. The apparatus may be such as described in U.S. Pat. No. 3,837,824, and comprises a pressure chamber 13 in which the bundle 11 of rods is placed, with one end of the bundle being supported by a cap 14 and the bundle of rods extending through a sleeve-type heating element 15 and thence between a pair of pressure rollers or wheels 16 and outwardly through a suitable liquid seal 17 and between a pair of rollers 18. The cap 14 securely holds and retains in position the end of the rods comprising the bundle, and the heating elements heats the rods to a temperature sufficient to effect bonding together of the rods and softening thereof such that the tensile force applied to the rods by the wheels or reciprocating clamps or winding drum or the like 18 draws the rods to a reduced cross-section, as indicated at 11' in FIG. 3. An inlet fitting 19 is provided into the chamber 13 for supplying high pressure air or gas to the chamber, and the fluid seal or gland 17 prevents escape of the high pressure gas from the chamber.

Figure 4:
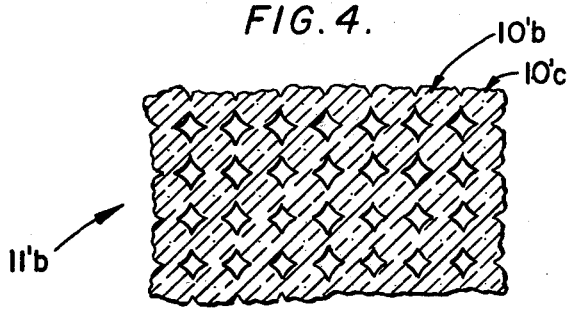
FIG. 4 is a somewhat schematic, greatly enlarged, transverse, sectional view of a fused togehter bundle of rods used for making a lens according to the invention.

A first embodiment of applicant's invention is illustrated in FIG. 4 and comprises a plurality of fused together rods 10'a, each having a core 20 of material having a first optical property and a concentric layer 21 of a material having a second optical property. In a preferred embodiment, the cores 20 comprise rods of crown glass which have an index of refraction of 1.5231 and which are used in distance vision, and the concentric layers 21 comprise flint glass having a desired refractive index for near vision. For example, the flint glass may have one of the refractive indices set forth in the following table to obtain a desired add for near vision as indicated in the following table:

| REFRACTIVE INDEX OF FLINT GLASS IN BLANK | ADD |
| --- | --- |
| 1.567 | .75 |
| 1.582 | 1.00 |
| 1.597 | 1.25 |
| 1.611 | 1.50 |
| 1.626 | 1.75 |
| 1.641 | 2.00 |
| 1.656 | 2.25 |
| 1.670 | 2.50 |
| 1.685 | 2.75 |
| 1.70 | 3.00 |

In a preferred embodiment of lens made in accordance with the invention, the cores or rods 20 of crown glass initially have a diameter of about 1/32 inch, and the layers of flint glass 21 on the rods or cores 20 have thickness of about 1/64 inch, thus defining an elongate rod 10 having a diameter of about 1/16 inch. The rods are grouped together in a bundle 11 having any convenient length as, for example, one foot or more, and a diameter of about 6 inches. The bundle 11 thus formed is then placed in any suitable apparatus, such as that indicated in FIG. 3, and subjected to a temperature of about 1200° F. and drawn down under slight compression to a diameter of about 2 inches. During the drawing of the bundle, the individual rods are fused together as indicated in FIG. 4, and the individual fibers or rods have a diameter of about 0.021 inch, with core diameters of about 0.010 inch. The reduced diameter bundle 11'a is then sliced or cut transversely to form blanks 22 from which the lens L is made, as by drop molding or grinding or a combination of drop molding and grinding, as desired. It may be found necessary to fuse the individual rods together before drawing the bundle of rods, and this may be accomplished by slowly heating the bundle to about 1200° F. and compressing it slightly. For the drawing operation, the section being reduced by the drawing operation is heated to about 1200° F. to 1275° F. and closely controlled at the temperature found to provide best operation of the drawing process. In the lens thus formed, the individual rods comprising the lens are not visually discernible when viewing through the lens, and the different refractive indices are uniformly dispersed throughout the lens, whereby a person using the lens is enabled to view objects at different distances from the lens and attain the proper focusing action without requiring the person to shift his gaze through different portions of the lens and also without experiencing optical jump. Also the production or manufacture of a lens in accordance with the invention eliminates considerable grinding and conserves glass, since the lens blank can be drop molded to the appropriate concave or convex form before grinding.

Figure 5:
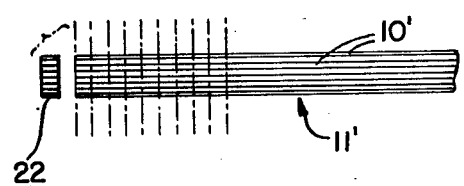
FIG. 5 is a view similar to FIG. 4 of a fused together bundle of rods for making a modified lens.
Figure 6:
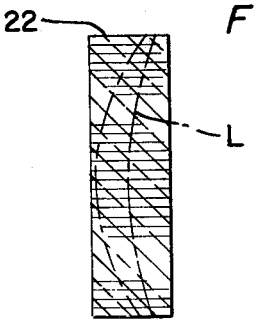
FIG. 6 is a somewhat schematic view illustrating the manner in which lens blanks or plates are sliced or cut from the bundle of rods to produce a lens therefrom.

The second embodiment of applicant's invention is illustrated in FIG. 5, and in this form of the invention a substantially identical procedure is followed, except that rather than a plurality of rods 10'a, each comprising a core 20 and concentric outer layer 21, a plurality of different rods 10'b and 10'c having different indices of refraction are placed in side-by-side relationship and fused together to form a bundle 11'b, which is then served or cut to form blanks from which lenses are produced.

Alternatively to the above lenses having the described optical characteristics, a sunglass or other type of light occluding lens may be produced by utilizing a clear material with or without a refractive index for enhancing vision for near or distant viewing and surrounding such material with a layer of colored material, to thus occlude a desired portion of light passing through the lens. Accordingly, either prescription or non-prescription sunglasses can be readily produced. Likewise, as viewed in FIG. 5, alternative rods could be made of colored material, if desired, to provide a desired degree of translucence to the lens thus produced.

Figure 8:
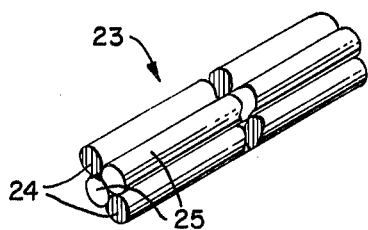
FIG. 8 is a prespective view, similar to FIG. 2, with a portion broken away, of a plurality of bundles placed together in accordance with a step in the manufacture of a lens of the invention.
Figure 9:
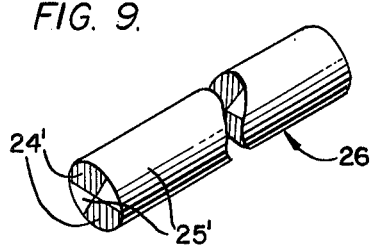
FIG. 9 is a perspective view of the bundle of FIG. 8, after fusing the individual rods together to form a composite rod.
Figure 10:
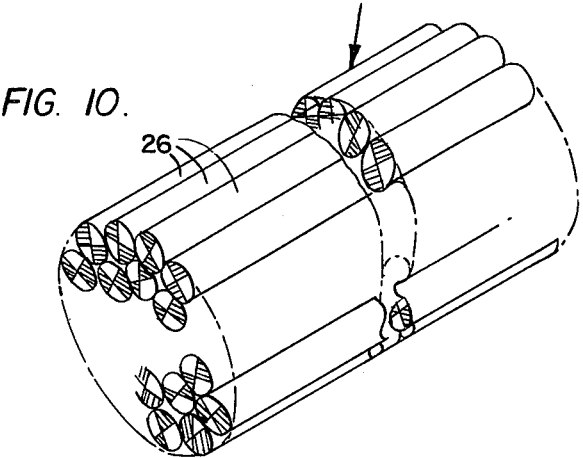
FIG. 10 is a perspective view, with portions broken away, of a bundle of the composite rods of FIG. 9.
Figure 11:
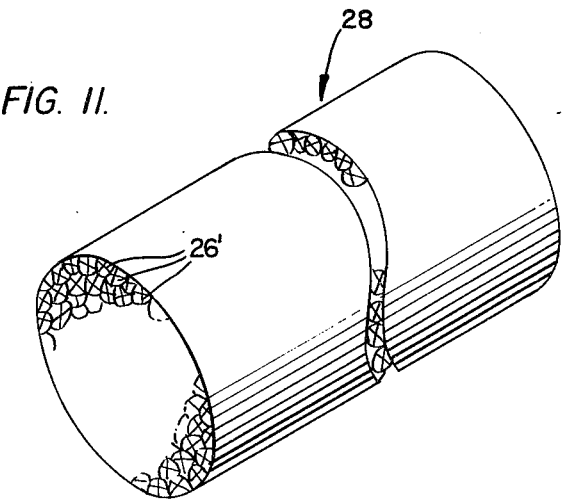
FIG. 11 is a perspective view, with portions broken away, of the rod of FIG. 10 after the composite rods are fused together.
Figure 14:
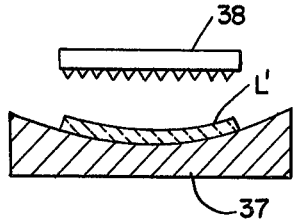
FIG. 14 is a schematic view of the manner in which the lens blanks are formed to an appropriate curvature, such that the axes of the rods therein will be parallel to the line of sight through all portions of the lens.
Figure 12:
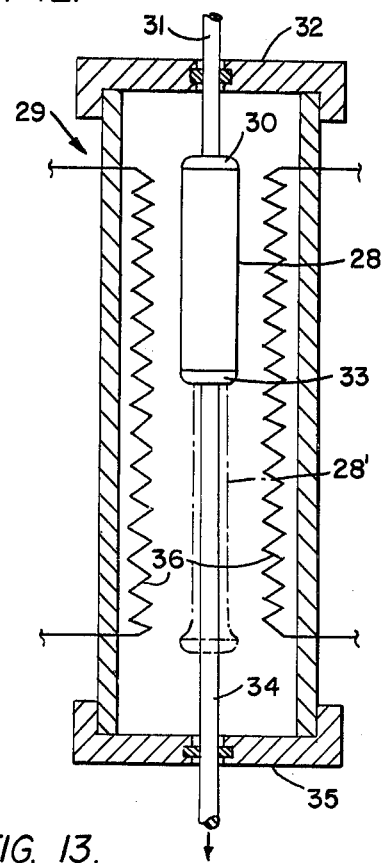
FIG. 12 is a somewhat schematic view of an apparatus used to heat and stretch the bundle of composite rods of FIG. 11.

A further modified lens and method is illustrated in FIGS. 8-15, and in the practice of this form of the invention, a bundle 23 of glass rods are assembled by selecting two glass rods 24 of one type of glass, as, for example, flint glass, having an appropriate refractive index for near vision, and a pair of rods 25 made of crown glass, for example, having an appropriate refractive index for normal distance vision. Each of the rods 24 and 25 has a diameter of about 1/32 inch, and the bundle 23 is about 12 inches in length. This assembly or collection of diverse glass rods as shown in FIG. 8 is readily accomplished by mechanization and, therefore, the different glass rods can be assembled rapidly and economically. The bundle 23 is then compressed under suitable heat and pressure to fuse the rods 24 and 25 together to form a composite rod 26, as seen in FIG. 9, in which the flint glass rods 24' are fused to the crown glass rods 25'. The composite rod 26 has a diameter of about 1/16 inch or a diameter slightly smaller than the collection or bundle 23 in FIG. 8, and the composite rod 26 has a length slightly greater than 12 inches.

A plurality of these composite rods 26 are then assembled into a bundle 27 to form a collection or bundle of rods having a diameter or about 4 inches. The composite rods 26 may be randomly placed in the bundle 27, and because of the provision of two different refractive indices in each composite rod 26 fused to define four separate portions of the rod, uniform dispersion or disposition of the different refractive indices throughout the bundle 27 is assured.

In making up the bundle 27, for example, more than 1,000 rods 26 may be required. The bundle 27 is then compressed under heat and pressure to form a composite rod 28 having a diameter of about 4 inches and comprised of a plurality of fused together composite rods 26'.

Figure 13:
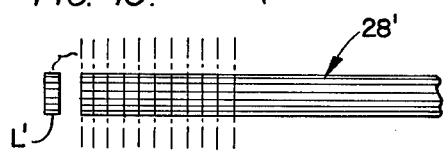
FIG. 13 is a schematic view, similar to FIG. 6, of a fused and stretched bundle of composite rods showing how lens blanks are obtained from the rod.
Figure 15:
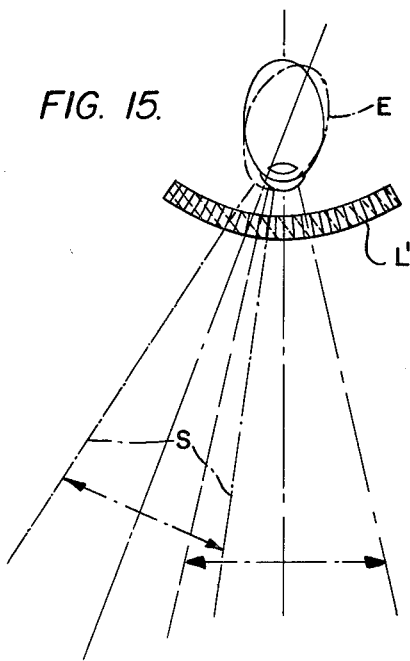
FIG. 15 is a schematic view illustrating how the line of sight through all portions of the lens is parallel to the individual rod axes.

The composite rod or bundle 28 is then placed in a suitable vacuum chamber apparatus 29 wherein the upper end of the composite bundle 28 is secured to a cap member 30 carried by the lower end of a rod 31 extended through the upper end of an end closure 32 on the apparatus 29. The lower end of the composite bundle 28 is secured to a cap 33 carried on the upper end of a rod 34 reciprocable through a bottom closure 35 on the apparatus 29. Suitable heating elements 36 are disposed in the apparatus 29 adjacent the bundle 28 for heating the bundle to soften the glass and enable it to be drawn or stretched as indicated at 28'. The drawn composite bundle 28' has a diameter of about 2 inches and a length of about 3 feet and it is from this composite bundle or rod that the lens blanks L' are cut, as indicated in FIG. 13.

The lens blanks L' are then supported on a suitable base or support 37 and a heat source 38 is provided above the lens blanks L' for heating and softening the lens blanks whereby they sag and conform to the configuration of the support 37. The thus formed lens blanks may then be stocked either as drop formed, or they may be semi-finished, i.e., ground and polished on one side. All that needs to be done to the lens for meeting a prescription is to effect final grinding thereof on the distance portion only of the prescription curvature. The add portion of the prescription for close viewing is secured by selecting the blank from that group containing flint glass of proper refractive index to produce the needed add when it is ground to the same curvature as the crown glass.

Thus in the lens produced, the axes of the fused together rods 26' comprising the lens L' are disposed parallel to the line of sight S from an eye E when looking through any portion of the lens L'.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A multifocal length lens comprising:
 a multiplicity of elongate glass rods each having a diameter and a first index of refraction and being positioned in generally parallel side-by-side relationship;
 a multiplicity of concentric layers, each surrounding one of said glass rods and each having a thickness approximately half the diameter of each rod and a second index of refraction different from said first index of refraction, one of said first and second indexes of refraction being suitable for use in distance vision and the other of said indexes of refraction being suitable for use in near vision, whereby light is transmitted longitudinally through both said rods and said concentric layers so that different focal lengths are obtained upon looking longitudinally through either said rods or said concentric layers of the multifocal lens, said glass rods and surrounding concentric layers forming a plurality of viewing rods, all said viewing rods being identical, said viewing rods all being fused together in side-by-side relationship with sufficient intimacy so that individual surrounded viewing rods are not visually discernible when viewing through the lens, all of said viewing rods being identical so that all rods adjacent any given rod are identical with said given rod and all viewing rods being uniformly arranged throughout the lens so that each unit area of the lens in all radial directions thereof is similar to all other unit areas of the lens, thereby providing the lens with uniform optical characteristics so that optical jump and other optical aberrations are not experienced when viewing through different portions of the lens or shifting the gaze from one portion of the lens to another portion thereof; all of said fused viewing rods having both ends thereof being ground so that adjacent ends of said viewing rods all have a common radius of curvature thereby forming a uniform lens having multifocal properties.

2. A lens as in claim 1, wherein the glass rods have an index of refraction for distance viewing and the concentric layers have an index of refraction for near viewing.

3. A lens as in claim 1, wherein the different optical characteristics include viewing rods having an index of refraction for distance vision and viewing rods having an index of refraction for near vision.

4. A lens as in claim 1, wherein the viewing rods comprise a core of a material having an index of refraction for distance vision and a surrounding, concentric layer of a material for near vision.

5. A multifocal length lens as in claim 1, wherein each viewing rod has a longitudinal axis and the longitudinal axes of the viewing rods being substantially perpendicular to a line drawn tangent to at least one radius of curvature of the lens at all portions thereof to be parallel to the line of sight when viewing through any portion of the lens.

6. A lens as in claim 1, wherein the glass rods each comprise crown glass, and the concentric surrounding layers comprise flint glass.

7. A lens as in claim 6, wherein each glass rod has a diameter of about 1/32 inch, and the concentric layers each have a thickness of about 1/64 inch.

8. A lens as in claim 1, wherein the glass rods include rods having different degrees of opacity to limit the amount of light transmitted through the lens to thus produce a lens for use in sunglasses and the like.

9. A lens as in claim 8, wherein the viewing rods comprise a core of clear glass, and a concentric, surrounding layer of opaque glass.

10. A lens as in claim 8, wherein some of the viewing rods are clear and alternate, adjacent rods are opaque.

11. A multifocal lens, comprising a plurality of small diameter glass rods fused together in parallel relationship and including adjacent rods of different refractive index uniformly dispersed throughout the lens, said rods of different refractive index including rods having a refractive index for distance vision and rods having a refractive index for near vision, whereby upon looking through any portion of the lens, vision for near and distant objects is enhanced and the gaze may be shifted from near to distant objects and vice versa without experiencing optical jump, all of said rods having both ends thereof being ground to a common radius of curvature to form a uniform lens having multifocal properties.

12. A lens as in claim 11, wherein the fused together rods viewing in the lens each comprises a composite rod of fused together rods of different indexes of refraction.

13. A lens as in claim 12, wherein each composite viewing rod comprises four fused together rods, two of the rods having an index of refraction for distance viewing, and two of the rods having an index of refraction for near viewing.

14. A lens as in claim 13, wherein the rods for near viewing lie in a plane perpendicular to the plane in which the two rods for distance viewing lie.

* * * * *